UNITED STATES PATENT OFFICE 2,500,958

PROCESS FOR PREPARING SULFIDIC PIGMENTS

James J. O'Brien, Baltimore, Md., assignor to The Glidden Company, Cleveland, Ohio, a corporation of Ohio No Drawing. Application November 19, 1947, Serial No. 787,038

16 Claims. (Cl. 106—301)

This invention relates to improvements in methods of making zinc and/or cadmium sulfide and sulfoselenide pigments of the extended or unextended types.

Barium sulfide solutions have been used extensively for many years in the production of zinc and cadmium pigments by reacting the barium sulfide solutions with soluble zinc and/or cadmium salts to bring about the precipitation of these metals in the form of sulfide. By appropriate selection of soluble zinc and/or cadmium salts, and by including selenium in the barium sulfide solutions when desired, the reactions may be directed to produce pure zinc sulfide pigments, cadmium zinc sulfide pigments, pure cadmium sulfide or sulfoselenide pigments, zinc lithopones, zinc-cadmium lithopones, cadmium lithopones, and cadmium sulfoselenide lithopones. In the use of barium sulfide solutions for producing such types of pigment, it has long been recognized that the barium sulfide hydrolyzes when dissolved in water to form barium hydrate and barium sulfhydrate. It has also been long indicated that within the concentration ranges and temperatures usually employed for reactions of the above type, the ratio of the sulfhydrate to hydrate concentrations is close to unity. A few proposals have been made in the past to alter the ratio of sulfhydrate to hydrate in the barium sulfide solutions prior to effecting the strike. Such alteration of the ratio has heretofore been made by employing hydrogen sulfide, or by adding barium hydrate or barium sulfhydrate to the barium sulfide solution. I have now found, however, that the ratio of sulfhydrate to hydrate in alkali-earth metal sulfide solutions can be increased appreciably by novel practice hereinafter described, and that by so increasing the ratio meritorious improvements in the resulting pigments can be achieved particularly in respect of the tinting strength, color and texture.

Accordingly, it is an object of the invention to provide a novel precipitation process for producing improved sulfidic and sulfoselenidic pigments.

It is a further object to provide a novel precipitation process wherein improvements in tinting strength, color and texture of sulfidic and sulfoselenidic pigments are obtained by increasing the ratio of barium sulfhydrate to barium hydrate in aqueous barium sulfide solutions which are used in preparing such pigments.

It is a further object to increase the ratio of alkali-earth metal sulfhydrate to alkali-earth metal hydrate in aqueous alkali-earth metal sulfide solutions by removing alkali-earth metal hydrate therefrom.

These and other objects will be apparent from the following description of the invention.

Barium sulfide hydrolyzes according to the following equation when dissolved in water:

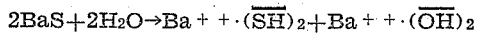

The molecular ratio of the sulfhydrate to hydrate is indicated here to be 1 to 1; the weight ratio corresponding thereto is about 1.18 to 1. Under some conditions, however, the molecular ratio may be less than 1 to 1. I have found, however, that whatever the initial ratio may be, by cooling the barium sulfide solution to temperatures below that at which it was made up, a condition can be established under which part of the barium hydrate becomes insoluble and can be filtered off. By so removing part of the barium hydrate, the weight ratio of sulfhydrate to hydrate in the filtrate can be increased up to about 3 to 1. The filtrate with its higher ratio may then be reacted at moderate temperatures preferably below about 30° C. with various soluble zinc and/or cadmium salts to produce sulfidic or sulfoselenidic pigments which manifest improved color, texture and tinting strength. In carrying out my invention I may start with any convenient concentration of barium sulfide either very dilute or approaching saturation. By cooling such solutions to temperatures at which barium hydroxide is precipitated and preferably to temperatures below room temperature, but above the freezing point of the solution, relatively large percentages of barium hydrate can be made to precipitate from the solution and can be filtered off conveniently. The barium sulfhydrate concentration never exceeds its solubility during this cooling treatment so that during the filtration none of it is removed from the solution in the form of a precipitate. However, some of it is occluded by the barium hydrate and is lost thereby. Nevertheless, the filtrate contains most of the sulfhydrate which was originally present while containing only that quantity of barium hydrate which was not precipitated and removed in the filtration step. As a result, the ratio of sulfhydrate to hydrate in the filtrate is increased substantially in direct proportion to the amount of barium hydrate retained on the filter.

It will be understood that the solution is preferably filtered while its temperature is at the lowest temperature used to alter the SH/OH ratio. After the solution has been filtered, however, it is no longer necessary to maintain the solution at the lowest temperature employed for altering the SH/OH ratio. I have effected the precipitation and filtration of barium hydrate in solutions at about 0° C., and after filtering the solutions have allowed them to warm up to room temperature before striking them with soluble zinc and/or cadmium salt solutions. During the strike, which is exothermic, the strike pulp becomes heated to even higher temperatures, none of which temperatures has been found to impair the improvements secured in tinting strength, color and texture as a result of the SH/OH ratio established at 0° C. However, it should be recognized that the solutions contain non-equilibrium ratios of SH to OH and are somewhat unstable and tend to return to equilibrium ratios. If a solution with an SH/OH ratio of 3 is allowed to stand 24 hours at room temperature before being used, its ratio will be found to have dropped considerably. If higher temperatures exist the drop in ratio will be even greater. Accordingly, I prefer to avoid temperatures much in excess of room temperature if there is apt to be a delay of hours in using a solution having a high SH/OH ratio. Likewise, the sooner a solution is used after obtaining the desired SH/OH ratio, the more certain one is of retaining the said ratio until the strike is made.

The refrigeration of the barium sulfide solution to modify its SH/OH ratio may be effected in any conventional or known manner, as by using mechanical refrigeration, ice, or other known refrigerating media. In practising the invention, I prefer to use barium sulfide solutions having a density between about 12° Bé. to 29° Bé. If solutions having a density below about 12° Bé are used, the removal of barium hydrate from the cooled solution reduces the density of the filtrate so much that unnecessarily large volumes of filtrate are needed to supply the barium and SH ions required in the subsequent strike with zinc and/or cadmium ions. For the same reason, it is desirable to effect the cooling of the barium sulfide solution without diluting it, as would be the case if ice were added directly to the barium sulfide solution.

The strike of the barium sulfide solution having a modified SH/OH ratio may be made in any of the usual manners with the soluble zinc and/or cadmium salt solutions. That is, the two solutions may be reacted together simultaneously, the modified barium sulfide solution may be added to the soluble salt solution, or the salt solution may be added to the modified barium sulfide solution. Other sequences may also be used without material effect on the improvements afforded by the modified SH/OH ratio of the barium sulfide solution. As indicated it is preferable that the strike solutions be at or below room temperature when brought together so that the final reaction temperature is less than about 30° C. The densities or concentrations of the soluble salt solutions are immaterial but preferably are neither more dilute nor more concentrated than is customary and well understood by those skilled in the art.

The pH of the strike pulp may range between about 1 and 7 depending on the particular pigment which is being prepared. It is generally recognized in the art that the cadmium pigments may be precipitated throughout this entire range, and it is also generally recognized that the zinc sulfide or lithopone pigments may be precipitated completely at a pH as low as about 5. The selection of appropriate pH values is accordingly well within the ability of one skilled in the art, due regard being given to recognized effects of pH on the pigmentary qualities of the particular type of pigment being precipitated and treated. I particularly prefer, however, to secure a final pH of about 6.0 in effecting the strikes for any of the zinc or zinc-cadmium pigments mentioned hereinafter.

The precipitates obtained from the strikes are generally dried, and then calcined under conditions of temperature and atmosphere well-known to those skilled in the art. However, some precipitates, such as the cadmium sulfide yellows, need not be calcined to be suitable for use as pigments. Accordingly it will be understood that the calcining step may be an optional step in a process for making pigments of improved quality in accordance with the principles of this invention.

The following examples illustrate the principles of my invention:

EXAMPLE 1

*Cadmium sulfide lithopone*

Barium sulfide solution of density 17° Bé. at 50° C. was refrigerated to 11° C., the insoluble barium hydroxide was filtered off and a barium sulfide solution having a density of 7.5° Bé. and an SH/OH ratio of 3 was obtained as the filtrate.

950 ml. of the above solution at a temperature of about 11° C. were reacted with 250 ml. of cadmium sulfate solution at 20° C. (density of solution—35° Bé. at 20° C.) to a pH of 1.7. The heat of reaction brought the reaction mixture to 27° C. The pigment was filtered off, then reslurried in one liter of water, filtered again, and finally dried at about 150° C.

Twenty-five grams of the dried pigment were calcined from an initial temperature of 368° C. to a final temperature of 583° C., and then quenched in water, filtered, washed and dried. The dry calcined pigment had a bright golden yellow color, exhibited good texture and a tinting strength of about 160%.

An additional 25-gram sample was calcined from an initial temperature of 368° C. to a final temperature of 532° C., then quenched in water, filtered, washed, filtered and dried. The color and texture were the same as above, but the tinting strength was about 180%.

EXAMPLE 2

*Pure cadmium sulfide*

1090 ml. of the filtrate produced in Example 1, but having a temperature of 16° C., were reacted with 250 ml. of cadmium nitrate solution having a temperature of 20° C. and a density of 34.6° Bé. The pH of the reaction mixture was 5.5. In effecting the reaction, the barium sulfide solution was added to the cadmium nitrate solution. The precipitated pigment was filtered, reslurried in two liters of water, re-filtered and then dried at about 150° C. 25 grams were calcined from an initial temperature of 368° C. to a final temperature of 532° C., quenched in water, filtered, washed, re-filtered and dried at about 150° C. The color was a bright golden yellow, the texture was good and the tinting strength was about 350%.

EXAMPLE 3

Pure cadmium sulfide-zinc sulfide yellow

A barium sulfide solution having a temperature of 50° C. and a density of about 19.5% Bé. was cooled without dilution to 10° C. and filtered while at this temperature. The filtrate had a density of 9° Bé. at 10° C. and an SH/OH ratio of about 2. 2840 ml. of the filtrate were reacted with a mixed solution having a temperature of 25° C. and containing 500 ml. of cadmium nitrate solution (density 35.3° Bé. at 25° C.) and 125 ml. of zinc nitrate solution (density 25° Bé. at 25° C.). The mixed solution was added to the barium sulfide filtrate. The final temperature of the reaction mixture was 27° C. and the final pH was 4.8. The precipitated pigment was filtered off immediately after the pH reached its final value. It has then reslurried in two liters of water at 50° C., filtered, and dried at about 150° C. 25 grams of the dry pigment were calcined from an initial temperature of 368° C. to a final temperature of 590° C., quenched in water, filtered, washed, re-filtered and dried. The color was a bright light yellow (Primrose) with good texture and a tinting strength of about 250%.

EXAMPLE 4

Pure cadmium-zinc sulfide yellow

A barium sulfide solution having a temperature of 100° C. and a density of 29° Bé. and an SH/OH ratio of .913 was refrigerated to 7° C. and the precipitated barium hydroxide was filtered off at the latter temperature. The density of the filtrate was 9° Bé. and its SH/OH ratio was 2.3. A strike solution was made up composed of 200 ml. of cadmium nitrate having a density of 35° Bé. at 29° C., and 50 ml. of zinc nitrate having a density of 32° Bé. at 33° C. The strike solution was added slowly to 1300 ml. of the above barium sulfide filtrate at 18° C. (SH/OH ratio of 2.3) after which the pH of the strike pulp was adjusted to 5.2. The precipitated "green" pigment was then filtered, then reslurried in 2 liters of water and agitated therein at 50° C. for one hour, after which it was filtered and dried at about 150° C. A twenty-five gram sample of the "green" pigment was calcined from an initial temperature of 368° C. to a final temperature of 591° C., quenched in water, filtered, washed and dried. It exhibited a clear light primrose yellow color and a tinting strength of 235%.

EXAMPLE 5

Pure cadmium-zinc sulfide yellow

A barium sulfide solution having a temperature of 40° C., a density of 17.5° Bé., and an SH/OH ratio of .923 was refrigerated to 7° C. and the barium hydroxide precipitate was filtered off. The filtrate had a temperature of 7° C., a density of 6.8° Bé. and an SH/OH ratio of 2.28. The 1400 ml. of this filtrate, at a temperature of 12° C. was slowly added to a strike solution composed of 200 ml. of cadmium nitrate having a temperature of 29° C. and density of 35° Bé., and 50 ml. of zinc nitrate having a temperature of 33° C. and density of 32° Bé. After all of the strike solution had been added to the barium sulfide filtrate, the pH of the strike pulp was adjusted to 5. The "green" pigment was calcined from an initial temperature of 368° C. to a final temperature of 591° C., quenched, filtered, washed and dried. The resulting pigment had a color which was slightly light to the Primrose Yellow standard color, and had a tinting strength of 250%.

EXAMPLE 6

Pure cadmium red

A barium sulfide solution having a temperature of 50° C. and a density of about 19.5° Bé. was cooled with dilution to a temperature of 8° C. and the precipitated barium hydroxide was promptly filtered off. The filtrate had a temperature of 8° C., a density of 8° Bé., and an SH/OH ratio of about 2.

30.25 grams of selenium were dissolved in 2750 cc. of the filtrate, after which 500 ml. of cadmium nitrate at 29° C. (density—35.3° Bé. at 29° C.) were added to the barium sulfide-selenium solution. The final pH was 5.0 and the final temperature was 27° C. The precipitated pigment was filtered immediately after the final pH was reached, then reslurried in two liters of water at 50° C., filtered again and finally dried at 150° C. Three calcination tests were made, as follows:

Twenty-five grams of the dry pigment were mixed with 6% of ammonium nitrate and the mixture was calcined in an ignition tube from an initial temperature of 368° C. to a final temperature of 538° C. The pigment was quenched, washed and dried in the usual manner. The color was a clear shade darker than the light red standard; tinting strength was about 175%.

EXAMPLE 7

Zinc sulfide lithopone

A barium sulfide solution having a temperature of 50° C. and a density of 19.5° Bé. was cooled to 0° C. and the precipitated barium hydroxide was filtered off. The filtrate had a density of 7° Bé. at 0° C., and an SH/OH ratio of 2.7. 3840 ml. of the filtrate were slowly added to 600 ml. of a zinc sulfate solution having a temperature of 29° C. and a density of 32° Bé. Zinc ion was found to be absent at a pH of 4.8 but a final pH of 5.6 was reached by adding barium sulfide solution before free sulfide ion was shown by the black nickel test. The precipitated pigment was digested in its mother liquor for one hour at about 24° C. and then filtered off. It was not subsequently washed, but instead was dried directly from the filter at about 150° C. Various maximum calcination temperatures were tried to determine the optimum temperature for color and opacity, all calcining tests being started at a temperature of 368° C. Samples of lithopone made by a current commercial process were also calcined at the same temperatures. At all final calcination temperatures which were tried, the color of the lithopone made in accordance with this invention was superior to the current commercial lithopone. At a final temperature of 650° C., the opacity of the lithopone made by the process described herein was about 125% as compared with the commercial material at 100%. At 682° C., the optimum temperature for the comercial material and giving it an opacity of 100%, the opacity of the lithopone made by my process was 115%.

In the following claims the term "sulfidic pigment" is used to refer to all conventional zinc and/or cadmium sulfide or sulfo-selenide pigments, such as zinc sulfide pigments, zinc lithopone pigments, cadmium-zinc sulfide pigments, cadmium sulfo-selenide pigments, cadmium sulfide lithopones, cadmium sulfo-selenide lithopones and cadmium sulfide pigments.

Having described my invention, what I claim is:
1. The method of increasing the ratio of sulfhydrate to hydrate in an aqueous alkali-earth metal sulfide solution, which comprises the steps of: cooling said solution to a temperature above its freezing point but sufficiently low to cause precipitation of alkali-earth metal hydroxide from said solution; and mutually separating at least part of said precipitate from its mother liquor.

2. The method as claimed in claim 1 wherein the alkali-earth metal sulfide solution is barium sulfide solution.

3. The method of making an improved sulfidic pigment which comprises the steps of: providing an aqueous alkali-earth metal sulfide solution; cooling said solution to a temperature above its freezing point but sufficiently low to cause precipitation of alkali-earth metal hydroxide from said solution; mutually separating at least part of said precipitate from its mother liquor; striking the resulting solution with an aqueous solution of a water-soluble salt of at least one metal selected from the group consisting of zinc and cadmium, thereby to produce a sulfidic precipitate of the metal of said soluble salt and mutually separating said sulfidic precipitate from the liquors of said reaction mass.

4. The method as claimed in claim 3 wherein the alkali-earth metal sulfide solution is a solution of barium sulfide.

5. The method as claimed in claim 4 wherein the aqueous barium sulfide solution which is provided has a density of between about 12° Bé. and 29° Bé. before being cooled.

6. The method as claimed in claim 5 wherein the solution is struck with a cadmium salt solution at a final pH of about 6.0.

7. The method of making an improved sulfidic pigment which comprises the steps of: providing an aqueous alkali-earth metal sulfide solution; cooling said solution to a temperature above its freezing point but sufficiently low to cause precipitation of alkali-earth metal hydroxide from said solution; separating at least part of said precipitate from its mother liquor; striking the resulting solution with an aqueous solution of a water-soluble salt of at least one metal selected from the group consisting of zinc cadmium, thereby to produce a sulfidic precipitate of the metal of said soluble salt; separating said sulfidic precipitate from the liquors of said reaction mass; and calcining said sulfidic precipitate under conditions which convert it to pigment.

8. The method as claimed in claim 7 wherein the alkali-earth metal sulfide solution is a solution of barium sulfide.

9. The method as claimed in claim 7 wherein the alkali-earth metal sulfide solution is a barium sulfide solution having a density of between about 12° Bé. and 29° Bé. before being cooled.

10. The method as claimed in claim 7 wherein the alkali-earth metal sulfide solution is a barium sulfide solution having a density between about 12° Bé. and 29° Bé. before being cooled; and wherein the treated barium sulfide solution is struck with a cadmium salt solution at a final pH of about 6.0.

11. The method as claimed in claim 7 wherein the alkali-earth metal sulfide solution is a barium sulfide solution having a density between about 12° Bé. and 29° Bé. before being cooled; and wherein the treated barium sulfide solution is struck with a zinc salt solution at a final pH of about 6.0.

12. The method as claimed in claim 7 wherein the alkali-earth metal sulfide solution is a barium sulfide solution having a density between about 12° Bé. and 29° Bé. before being cooled; and wherein the treated barium sulfide solution is struck with a mixed solution of zinc and cadmium salts at a final pH of about 6.0, the zinc and cadmium salts being proportioned to produce a yellow pigment.

13. The method of making an improved sulfidic pigment which comprises the steps of: providing an aqueous alkali-earth metal sulfide solution; cooling said solution to a temperature above its freezing point but sufficiently low to cause precipitation of alkali-earth metal hydroxide from said solution; separating at least part of said precipitate from its mother liquor; dissolving selenium in the mother liquor; striking the resulting solution with an aqueous solution of water-soluble salt of metal selected from the group consisting of cadmium and mixtures of cadmium and zinc, thereby to produce a crude sulfo-selenidic pigment precipitate; separating said crude precipitate from the liquors of the reaction mass; and calcining said crude precipitate under conditions which convert it to pigment.

14. The method as claimed in claim 13 wherein the alkali-earth metal sulfide solution is a solution of barium sulfide.

15. The method as claimed in claim 13 wherein the alkali-earth metal sulfide solution is a barium sulfide solution having a density between about 12° Bé. and 29° Bé. before being cooled.

16. The method as claimed in claim 13 wherein the alkali-earth metal sulfide solution is a barium sulfide solution having a density between about 12° Bé. and 29° Bé. before being cooled; and wherein the treated barium sulfide solution is struck with a cadmium salt solution at a final pH of about 6.0.

JAMES J. O'BRIEN.

REFERENCES CITED

The following references are of record in the file of this patent:

UNITED STATES PATENTS

| Number | Name | Date |
|---|---|---|
| 2,050,802 | Mitchell et al. | Aug. 1, 1936 |
| 2,030,887 | Mitchell et al. | Feb. 18, 1936 |